(No Model.)

T. P. FLETCHER.
CORN HUSKER.

No. 287,269. Patented Oct. 23, 1883.

WITNESSES
Villette Anderson.
John T. Morrow

INVENTOR
Thos. P. Fletcher
By Anderson Smith
his ATTORNEYS

UNITED STATES PATENT OFFICE.

THOMAS P. FLETCHER, OF LAWRENCE, KANSAS.

CORN-HUSKER.

SPECIFICATION forming part of Letters Patent No. 287,269, dated October 23, 1883.

Application filed August 8, 1883. (No model.)

*To all whom it may concern:*

Be it known that I, THOS. P. FLETCHER, a citizen of the United States of America, residing at Lawrence, in the county of Douglas and State of Kansas, have invented certain new and useful Improvements in Corn-Huskers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
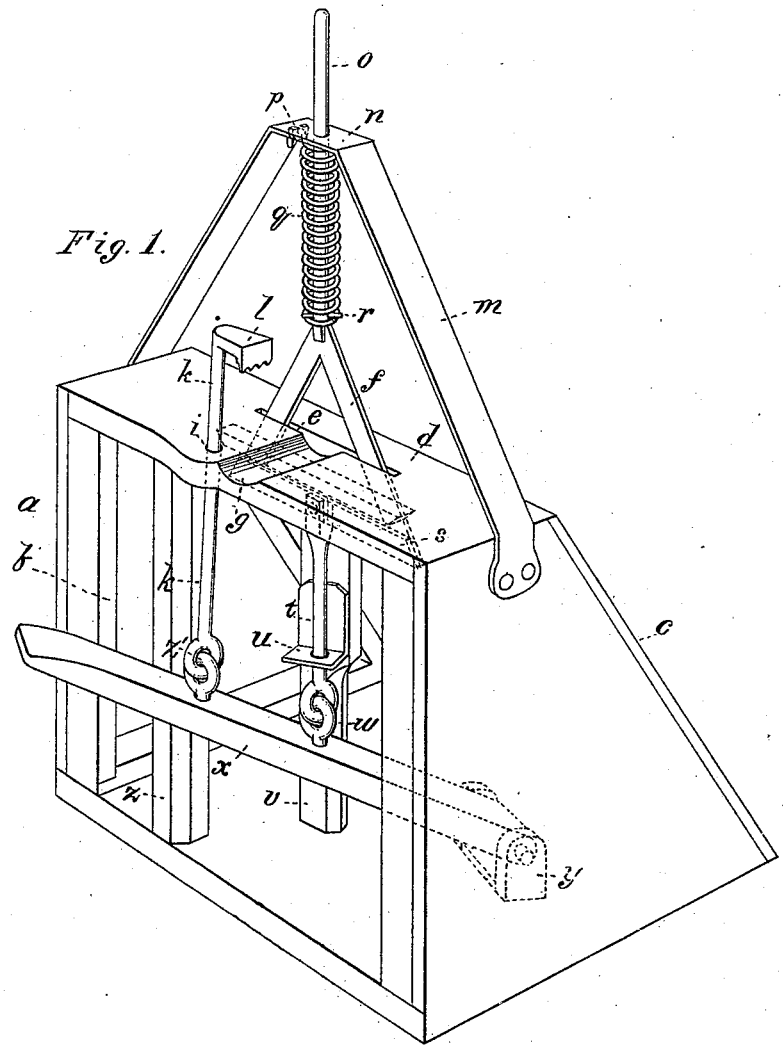
Figure 2:
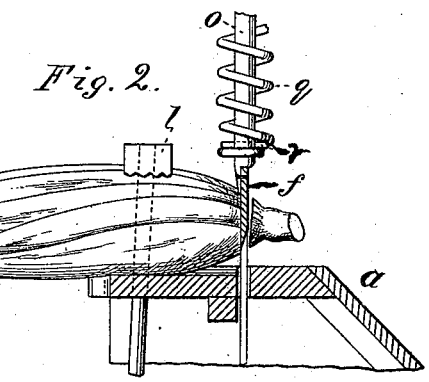

Figure 1 of the drawings is a representation of this invention, and is a perspective view. Fig. 2 is a detail in section, showing the knife and claw depressed.

This invention has relation to machines for husking corn; and it consists in the construction and novel arrangement of parts, as will be hereinafter fully described, and particularly pointed out in the claim appended.

The object of the invention is to husk corn more rapidly and neatly than has been heretofore done by the machines or huskers now in use, and it is especially adapted to husking ears of green corn in canneries and other places.

Referring by letter to the accompanying drawings, $a$ designates the frame, which is preferably made with an open front, $b$, and a rearwardly-inclined closed back, $c$.

$d$ designates the table of the machine, which is provided with a vertical longitudinal slot, $e$, for the inverted V-shaped knife $f$, a transverse groove, $g$, extending from the rear wall of the slot $e$ to the front edge of the table, for the ear of corn, and a vertical perforation, $i$, near the front edge of the table and at the left side of the groove, for the passage of the rod $k$, carrying the husking-claw $l$ at its upper end.

$m$ designates a frame secured at its ends to the ends of the frame $a$, and converging to a horizontal portion, $n$, which is perforated for the passage of the rod $o$, to the lower end of which the knife $f$ is secured. The said horizontal portion $n$ is provided on its under face with a perforated lug, $p$, to which the upper end of a spiral spring, $q$, is secured, the lower end of said spiral spring $q$ being secured to the rod $o$ by a cross-pin, $r$, passed through the rod just above its junction with the knife $f$.

The lower ends of the arms of the knife are connected by a cross-head, $s$, at the upper end of a rod, $t$, passing down through a guide, $u$, upon an upright, $v$, within the frame $a$, about the middle of the rear edge of the table, and said rod $t$ is connected by an eyebolt, $w$, to a foot-lever, $x$, fulcrumed in bearings in a casting, $y$, on the floor of the frame, on the right of a central line running from front to rear of the said floor. By this arrangement the casting $y$ may be turned to throw the lever $x$ to the left of the central line aforesaid at its power end at an angle of about thirty degrees, to prevent the husks from interfering with it when the machine is being operated. The rod $k$, carrying the husking-claw $l$ at its upper end, is secured to the foot-lever $x$, near its forward end, by an eyebolt, $z'$, and a vertical guide-post, $z$, near the front and left end of the frame $a$, is provided, to prevent the foot-lever $x$ from being pushed laterally to the left in its descent.

The operation of the machine is very simple, and is as follows: The machine being in its normal position—*i. e.*, with the foot-lever elevated—the butt-end of the ear of corn is placed in the groove under the knife, so that when the knife is brought down by the foot-lever it will cut the husks and cob off close to the kernels of corn. After the stroke has been made, remove the foot, and the spiral spring will retract and return the lever to its place. At the same time, however, that the knife descends, the husking-claw also descends and clamps a bunch of the husks, which are now all loose on the ear, and the lever is held down while the ear of corn is quickly and easily removed from the husks. Some of the husks will probably still adhere to the ear of corn; but they can be readily removed.

Having thus fully described my invention, what I claim as new, and desire to secure by Letters Patent, is—

In a corn-husking machine, the frame $a$, table $d$, provided with the vertical longitudinal slot $e$ for the knife $f$, and the transverse groove $g$ for the ear of corn, the frame $m$, and the uprights $v$ and $z$, in combination with the inverted-V-shaped knife $f$, the rod $o$, spiral spring $q$, the rod $t$, eyebolt and cross-head $s$, the rod $k$, the husking-claw $l$, and the foot-lever $x$, substantially as specified.

In testimony whereof I affix my signature in presence of two witnesses.

THOMAS P. FLETCHER.

Witnesses:
JOHN CHARLTON,
J. P. CREME.